US009195661B2

(12) United States Patent
Ohlenbusch et al.

(10) Patent No.: US 9,195,661 B2
(45) Date of Patent: Nov. 24, 2015

(54) METHOD AND SYSTEM FOR CLICK-THRU CAPABILITY IN ELECTRONIC MEDIA (75) Inventors: Alvin Ohlenbusch, Ibach (CH); Parvez Naqvi, Bethesda, MD (US); Raymond Maxwell, Sixmilebridge (IE); Bou-Kau Yang, Potomac, MD (US); Alan Kelly, Carrigaline (IE)

(73) Assignee: Thomson Reuters Global Resources, Baar (CH)

( * ) Notice: Subject to any disclaimer, the term of this patent is extended or adjusted under 35 U.S.C. 154(b) by 1351 days.

(21) Appl. No.: 11/759,372

(22) Filed: Jun. 7, 2007

(65) Prior Publication Data

US 2008/0307297 A1 Dec. 11, 2008

(51) Int. Cl.
*G06F 17/00* (2006.01)
*G06F 17/30* (2006.01)
*G06F 17/22* (2006.01)

(52) U.S. Cl.
CPC ...... *G06F 17/30014* (2013.01); *G06F 17/2235* (2013.01); *G06F 17/30882* (2013.01)

(58) Field of Classification Search
CPC .......... G06F 17/30014; G06F 17/2235; G06F 17/30882
USPC .................................. 715/208, 234, 255, 205
See application file for complete search history.

(56) References Cited

U.S. PATENT DOCUMENTS

| | | | |
|---|---|---|---|
| 5,983,244 A * | 11/1999 | Nation | 715/236 |
| 6,192,165 B1 * | 2/2001 | Irons | 382/306 |
| 6,219,679 B1 * | 4/2001 | Brisebois et al. | 715/206 |
| 6,360,254 B1 | 3/2002 | Linden et al. | |
| 6,772,394 B1 * | 8/2004 | Kamada | 715/210 |
| 6,976,210 B1 * | 12/2005 | Silva et al. | 715/205 |
| 7,000,179 B2 * | 2/2006 | Yankovich et al. | 715/222 |
| 7,103,838 B1 * | 9/2006 | Krishnamurthy et al. | 715/202 |
| 7,181,502 B2 * | 2/2007 | Incertis | 709/217 |
| 7,305,612 B2 * | 12/2007 | Chakraborty | 715/221 |
| 7,478,336 B2 * | 1/2009 | Chen et al. | 715/770 |
| 7,519,573 B2 * | 4/2009 | Helfman et al. | 1/1 |
| 7,523,389 B2 * | 4/2009 | Hirata | 715/205 |
| 2003/0005002 A1 * | 1/2003 | Chen et al. | 707/515 |
| 2004/0012601 A1 * | 1/2004 | Sang et al. | 345/581 |
| 2004/0028266 A1 | 2/2004 | Jones et al. | |
| 2004/0066529 A1 * | 4/2004 | Wu et al. | 358/1.15 |
| 2004/0078749 A1 * | 4/2004 | Hull et al. | 715/500 |
| 2005/0076295 A1 * | 4/2005 | Simske et al. | 715/517 |
| 2005/0114759 A1 * | 5/2005 | Williams et al. | 715/512 |
| 2005/0183004 A1 * | 8/2005 | Lerner et al. | 715/512 |
| 2005/0188304 A1 | 8/2005 | Lawton et al. | |
| 2006/0008113 A1 * | 1/2006 | Matsukubo et al. | 382/100 |
| 2006/0215233 A1 * | 9/2006 | Hirai et al. | 358/448 |
| 2006/0288268 A1 * | 12/2006 | Srinivasan et al. | 715/505 |
| 2007/0098285 A1 * | 5/2007 | Yahata et al. | 382/239 |
| 2007/0118391 A1 * | 5/2007 | Malaney et al. | 705/1 |
| 2007/0130518 A1 * | 6/2007 | Shavit et al. | 715/530 |
| 2007/0288853 A1 * | 12/2007 | Neil | 715/760 |
| 2008/0005666 A1 * | 1/2008 | Sefton et al. | 715/523 |

OTHER PUBLICATIONS

Microsoft Interactive Developer, May 1997, No. 1 (Translation of cited text of reference from corresponding Japanese Application No. 2010-511235).

* cited by examiner

*Primary Examiner* — Thu Huynh
(74) *Attorney, Agent, or Firm* — Bartholomew J. DiVita; Jeanpierre J. Giuliano (57) ABSTRACT

Methods and systems for capturing, collecting, analyzing and auditing of electronic documents. In an embodiment, there is provided the ability to present an audit function or "click thru" capability with respect to image files, non-structured text, non-structured html, and pdf documents.

21 Claims, 7 Drawing Sheets

Clicking on the "as filed" values will link back to the source document highlighting the item referenced

Selecting Pretax Income, a box will open to show how the value was derived from the "as filed" values

METHOD AND SYSTEM FOR CLICK-THRU CAPABILITY IN ELECTRONIC MEDIA

BACKGROUND OF THE INVENTION

1. Field of the Invention

The present invention generally provides click-thru capability in electronic media, including, without limitation, unstructured Hyper-text Markup Language (HTML) files, Portable Document Format (PDF) files, and unstructured text files.

2. Description of the Related Art

All references cited in this specification, and their references, are incorporated by reference herein where appropriate for teachings of additional or alternative details, features, and/or technical background.

Many important decisions are made on the basis of information gleaned from various sources. For example, financial information is often extracted from a number of sources. Investors, auditors, analysts and creditors often depend on such financial information for making investment, credit, advice and resource decisions. Optimally, any financial report should be verifiable, understandable and material. As would be understood, information misrepresented, or absent from a financial report could have far reaching implications for people depending on the information. Incomplete or erroneous data could result in significant financial loss. The efficient collection and auditing of data regarding a company is of paramount interest to investors and creditors.

As in any information gathering, some sources of financial information are considered more reliable than other sources. For example, in light of Sarbanes-Oxley and other financial reporting legislation, financial reports of public companies to national regulatory agencies are considered by many to be generally trustworthy. The difficulty with such reports is that they are often complex, preventing the reviewer to quickly glean the data needed to generate a fully-informed decision. Further, as such reports are mandated at only set points in time, information gleaned from a federally-mandated security filing may be inadequate at a point in time remote from the filing date of the report.

In order to provide persons with readily-digestible pertinent and timely information, a number of organizations are involved in digesting information from multiple sources of data and displaying such information in a user-friendly manner. Such synopsized information may be garnered from disparate sources, or may be calculated from information garnered from disparate or the same source, which may not be wholly evident by the presentation made to the viewer. While the source of the information may be denoted in footnotes, etc. to the synopsis, because of the time involved in retrieving such original sources and reviewing the same, most reviewers rely almost wholly upon the information that is portrayed to them.

For example, data for any particular financial summary may be gleaned from hundreds of pages of financial performance data that are compiled and published multiple times per period. The conventional practice of transferring and collecting data from electronic documents typically requires manually typing data into a new document or performing a traditional cut-and-paste operation if the source data has this capability. Both of these methods are error-prone (with respect to cut-and-paste operations, for example, a failure to cut a single number may have an order of magnitude effect on an overall financial view). Time spent performing these intensely manual processes would be better spent by auditing the data verses performing costly administrative tasks in support of such operations. As would be understood, with so much data to manually collect and audit, errors in transcribing and copying data can hardly be eliminated in any financial compilation. Further, a failure to fully understand the source of information, or the manner in which it was generated, may have serious unintended consequences in decisional matters.

Public companies worldwide are often required by their national laws to produce and publish financial statements so individuals and institutions can make reasonable decisions regarding their relationships with public companies. The majority of this reporting is accomplished by submitting electronic documents to the appropriate government regulatory authorities, such as the U.S. Securities and Exchange Commission. The electronic document format acceptable to different regulatory authorities differs between countries. Presently, such documents may take the form of Portable Document Format (PDF) native files, Portable Document Format (PDF) image files, structured Hyper-Text Markup Language (HTML) documents, unstructured text files and the like. The documents may additionally be heavily formatted for presentation purposes.

Hyper-Text Markup Language (HTML) is a language for the presentation of electronic documents. It is a scripting protocol defining the structure and layout of a page, such as a web page used on the World Wide Web. By use of tags and attributes, a page is assembled to convey a document in a specific format designated by the author. HTML documents were originally intended to facilitate textual presentation using a cross platform protocol when browsing the Internet.

A Portable Document Format (PDF), the de facto standard for file exchange, is a self-contained cross-platform document similar to HTML. PDF documents differ in that they are intended to appear the same whether on paper or on screen, regardless of the computer or printer involved. PDF and HTML documents may both contain images. Unlike HTML documents, however, PDF documents may be highly compressed. Image files, such as those provided for by Portable Document Format (PDF) image files, do not presently provide "cut-and-paste" functionality for the overlying data. PDF documents may be either a "native PDF" file or a scanned image PDF file. Native PDF files are scannable and capable of being printed without the need for PostScript conversion. Native PDF are searchable and are of significantly smaller file size than scanned image PDF files (which must be printed through a PostScript conversion). Some agencies, such as the MSRB, allow native PDF or image PDF filings.

Other than by footnoting or keying in the source of the information, current electronic document data extraction methods do not provide means for collecting and managing the location from which the data was originally sourced by an analyst. An electronic source document presented as an image file, native PDF, etc. must be manually transferred to the new document and manually referenced for cases of auditing. The ability to present an audit function or "click-thru" capability is unknown, particularly with respect to image files, non-structured text and html, and PDF documents.

Through the embodiments described herein, there is disclosed a method and system to capture click-thru data from the electronic media, such as documents for the collection, analysis and auditing of financial information. These methods and systems described are presently not available.

SUMMARY OF THE INVENTION

There is provided herein an automated computer implemented method comprising: (a) receiving a request relating to a hyperlink of a first electronic document; (b) identifying a second unstructured electronic document comprising a set of information relating to the hyperlink; and (c) transmitting a signal relating to the second electronic document. By "electronic document" it is meant to include herein word documents, image documents and applications. An example of an application, includes a financial application, such as, Thomson ONE and the like.

Further embodiments include:

An automated computer implemented method comprising: (a) identifying from an image document associated with a plurality of pixels a map set of coordinates defining the position of a select image on said image document; (b) defining a unique pointer to the image document; and (c) storing the select image associated with said map set of coordinates and said unique pointer. By pixel it is meant to the smallest part of an electronically coded image.

An automated computer implemented method comprising: (a) identifying from an image document associated with a plurality of pixels a map set of coordinates defining the position of a select image on said image document; (b) deconstructing said select image into subunits and associating said subunits with a subunit map set of coordinates; (c) selecting a unique pointer to said image document; and (d) storing said deconstructed subunits in association with said subunit map set of coordinates and said unique pointer to said image document.

BRIEF DESCRIPTIONS OF DRAWINGS

Embodiments of the invention are illustrated in the accompanying drawings in which.

DETAILED DESCRIPTION OF THE INVENTION

Disclosed in embodiments herein is a method and system allowing for a click-thru audit trail for information obtained from electronic documents, including non-structured html-based and non-html documents. Further disclosed in an embodiment is a system and method for built-in automation of the capturing, collecting, analyzing and auditing of financial data captured from electronic media, including image-based media.

Within an image document, such as a image-PDF file, and non-structured documents, such as non-structured HTML documents, there are elements which include text, images, and other objects related to the contents of the page. For example, a text element might include a word, a character, such as for example a number or letter, many words, or any combination of words and characters. An image electronic document, such as a Portable Document Format (PDF) file, and a non-structured HTML document is optimized for display purposes and not for the extraction of text.

The program PDFTron allows for the indexing of elements recorded in a native PDF document by means of coordinate mapping a rectangular or semi-rectangular patch about the element. That is, the element is encompassed by a bounding box that defines its position on the page with respect to all other pixels comprising the page. The bounding box is the rectangle that encompasses the text and may be defined as the four points of an isolated subset of pixels mapping the vertices of the box. It comprises an x,y page coordinate for the bottom left corner, and an x',y' page coordinate for the top right corner of the rectangle. By such indexing, the position of an element comprising one or more characters can be found using a search function.

PDFTron is not configured to allow for trace mapping between different documents. A person, such as a financial analyst, reviewing image electronic documents, or non-structured html/text documents, might only be interested in select portions of these documents, the combination of which may be used to generate a new document. While PDFTron would allow one to extract select information from each page of a native PDF and paste such information into a single document, the program is not configured for recording where the information was appropriated from other than by means of manual input of a note that may be added to the copied material.

In one exemplary embodiment, there is provided a system and method for allowing not only automated tracing of the origin of material comprising a document, but for allowing step-through of select individual elements recorded in a document to review the documents from which the select individual elements were extracted.

In such an embodiment, a directional pointer is determined for each page from which information is selected and imported into another document, and each of the elements on such page is delimited by a bounding box so as to generate a map of the element's position on the page (and its position with respect to other elements on the page). Such delimited elements are then extracted. Advantageously, the elements may further be parsed into characterize-sized pieces, each delimited by its own bounding box with the bounding box taking account into such parameters as font size and width of each character. The characters can then be sorted into a top to bottom, left to right, representation of all of the elements on the page from which they are extracted, forming an array matrix. The system may then group the characters into words and phrases, numbers etc., based upon recognition of the type of character involved. For example, a word may be defined as a set of alphabetic characters with minimal separation 'space." The ending of a word may be defined as either a 'space', the end of the line or where the next character may be considered sufficiently far away. Similarly, a phrase may be considered a set of words separated by single 'spaces' on, or nearly on, the same horizontal line.

By specifically providing for mapping of each character on a page, and from such mapped character automatically determining the elemental fundamental of which character is associated (e.g., such as a word or phrase), input of information into a secondary document can be greatly simplified, that is interaction with a character, such as clicking on the same, may be used to map and grab the elemental fundamental into the secondary document. For example, the x,y coordinate of a mouse over a character may be used to determine an appropriate bounding box of a fundamental element on that page. Thus, for example, if the mouse coordinate is found to be within one of the bounding boxes the character may be checked to determine whether it is a numeric and characters the left and right of the selected character may be examined to determine their numeric status, with additional characters on each side which are numeric being grouped together to form a elemental fundamental (i.e., a isolated numeric string). The elemental fundamental number string may be further surrounded by a rectangle and highlighted. As long as the mouse remains over a predetermined type of element, such as a numeric character the grouping may expand to include additional elements within proximity to the primary character indicated by the mouse coordinates. The entire elemental fundamental may then be exported to another document, such as a summary document.

Further to such example, the reviewer of the summary document may determine the path from which an individual number string of the summary document was extracted by highlighting the number string using, for example, a mouse (for example by double clicking on it). As the number string is associated with a particular source document pointer, as well as is mapped to said particular source document such that the position of the number string on such document may be highlighted or otherwise emphasized, the reviewer can quickly access the original source document and view where the information incorporated from the source document was obtained. Thus, there is provided click-thru capacity, allowing one to access in some cases multi-layers of source documents with respect to a particular input in the summary document.

Beyond mapping characters and fundamental elements associated with such characters, in an embodiment there is provide a system and method for associating a fundamental element with possible corresponding other elements, such as phrases related to a numeric figure (for example, those on the same horizontal line and built using the aforementioned process of creating the array can be examined and selected as a label for the numeric figure). The reviewer may, for example, indicate his/her choice of labels, for example by right-clicking on the previously highlighted rectangle of numbers. Labels from a menu of possible labels comprised of the leftmost phrase on the line and the nearest phrase to the left may be presented to, and selected by the user. Default actions may be incorporated, for example, a default action may be to use the nearest phrase to the left. The length of the phrase for a label may be limited by a predetermined value comprising the number of words or characters in the phrase. A number within a phrase, may use the phrase itself as the label. The length of the phrase may be predetermined in a fashion similar to that mentioned above.

In another embodiment, a page array as mentioned in a previous embodiment may be ordered in a top to bottom, left to right fashion for the purposes of recognizing and constructing a table. If the y coordinate of a bounding box within the page array is within a predetermined threshold value, it may be recognized that text associated with the bounding box is on the same horizontal line. As with some documents, such as Portable Document Format (PDF) files, horizontal text may not exactly line up to a column/row format in its native state.

Recognition of columns within a table may be performed by examination of the line above and below the current text that has an overlapping bounding box in the horizontal direction. Analysis of the horizontal and vertical spacing can determine how to organize the phrases into table 'cells'. The end of the table may be determined by whether the end of the page is reached or the encounter of a line that does not 'fit' in the columns as the rest of the text may.

In another embodiment, a user such as a financial analyst may identify a table in an electronic document. The document, such as a Hyper-text Markup Language (HTML) document or Portable Document Format (PDF) file may contain columns to use as new values in the continued analysis of the financial status of a company. Values from a table may also come from a page array similar to that mentioned in a previous embodiment.

Indication of interest in a table and/or column by the user, such as by clicking with a mouse button may cause parsing of the text and/or the recognition and/or creation of a table as mentioned in the previous embodiments. For example, a user may select the 2006 column of a given Income Statement to include as new values for a specific company's financial position. Prior documents, having been previously entered are searched for similar labels. In another example, a previously collected value for the 2005 report may have had a label "Net Income". A search through the current table for the same phrase "Net Income" may return a column to which the user is directed and where the new value may be selected. The data is automatically collected for the current document based on past information collected and analyzed.

Figure 1:
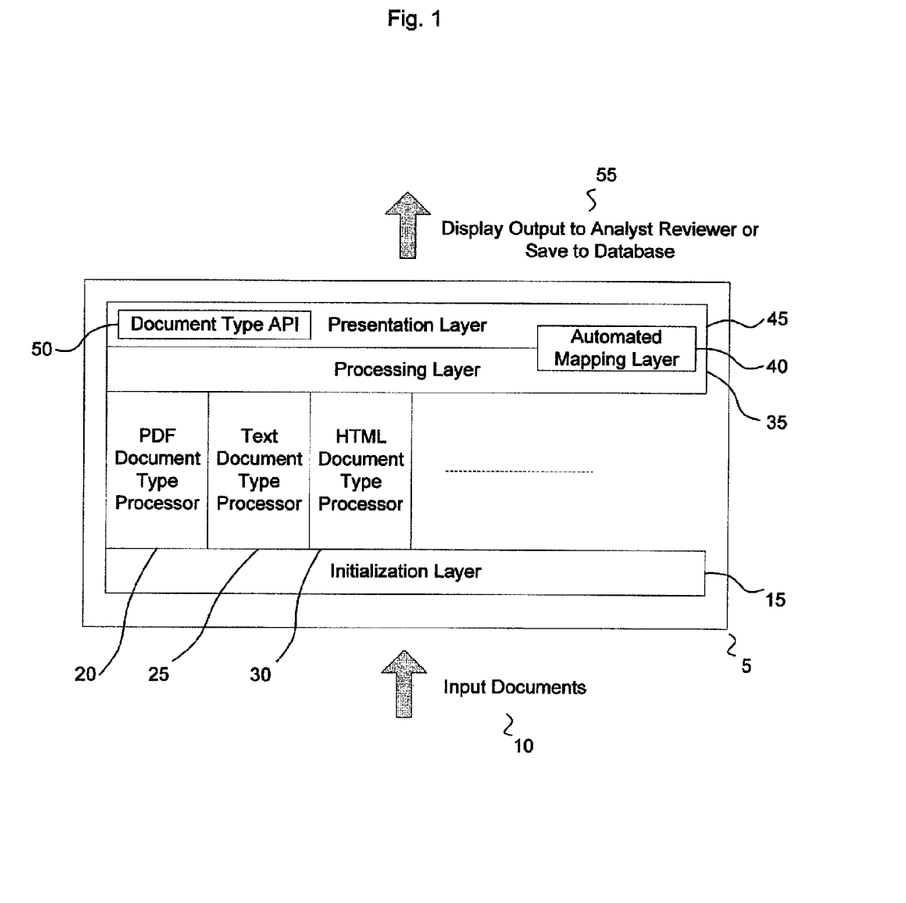
FIG. 1 is an exemplary block diagram illustrating the system.

FIG. 1 illustrates an exemplary embodiment of a capturing, collection, and analysis of electronic document system. The architecture of the system 5 may be composed of several layers comprising the input, processing and output of the system. The system of this embodiment may be called from within other windows applications supporting data collection. A document for Input 10 is read and sent to the appropriate document type processor 20 to 30 by the Initialization Layer 15. The document may have an associated identification number (ID) and format which can be downloaded from a secure application program interface, such as SECAPI. In addition to loading the document, the Initialization Layer 15 may provide the ability to integrate with other document providers.

The document processors 20 to 30 may comprise the document types of Portable Document Format (PDF), Text, and Hyper-text Markup Language (HTML). The document processor layer can open and read text from the document and identify and format tables of data within the document. In addition the document processors may extract table data such as rows and columns along with the corresponding positional information for each cell in the table. Document processors such as that used for Portable Document Format (PDF) files 20 may send table information to the Processing Layer 35 after converting the table information to a standard format. The complexity of the processing layer may be reduced with the use of such a standard table format. Additional document type processors may be added to the system as needed.

The Processing Layer 35 of the system may identify the type of table, such as for example, a Balance Sheet, an Income Statement, etc. and apply the appropriate table rules to analyze the data. Rows and columns of the table can be identified and determined as to which rows should be merged to form a single row and which columns should be merged to form a single column. If rows or columns are merged, the click-thru information can be updated to reflect theses changes. The Processing Layer 35 can also save the data in a format, such as a database, that will allow downstream applications to generate tables with click-thru information.

The Automatic Mapping Layer 40 reviews the history of data collected for the specific company being analyzed and/or audited and maps the data directly to the collection system. The mapping layer has the ability to learn over time based on the data collected and the selections made by analyst reviewer.

Output 55 of the information from the system by the Presentation Layer 45 may be divided into two or more parts. Two potential divisions are for saving data and for displaying the document to the analyst reviewer. Saving data may include saving the table information such as the rows and columns in a database, and saving the mapping information into a database. The display portion may comprise the ability to display the entire document for collection, display extracted tables only with proper rows and columns, and display data mapped automatically in different colors based on the types of mapping issues and/or the success rates. Within the Presentation Layer 45, the Document Type API 50 may exist. The API can be used to assist with the presentation and interface with a calling program.

Figure 2:
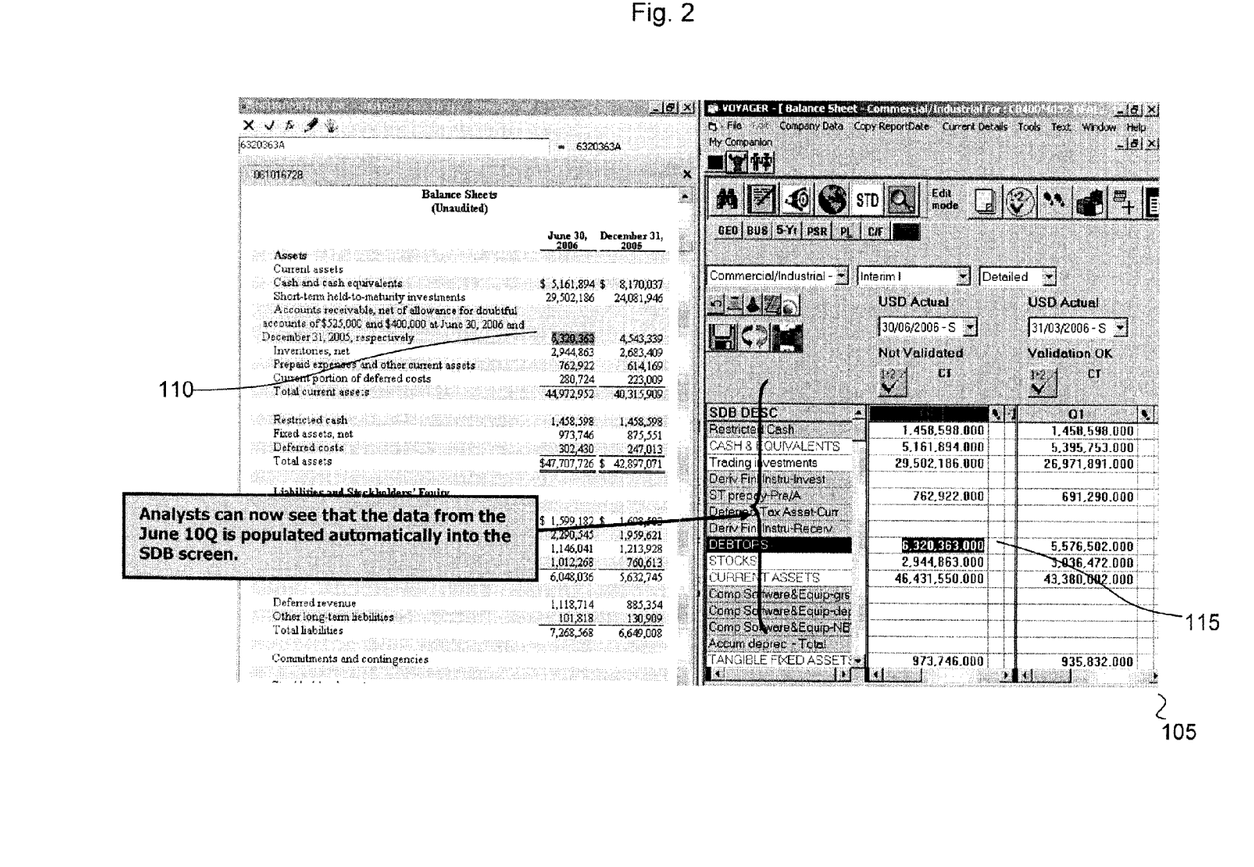
FIGS. 2-5 are exemplary embodiments of a computer screen shot illustrating capture and analysis of information from an electronic document.

FIG. 2 is an exemplary screen shot of an embodiment of the system and methods. Screen shot 105 depicts two windows where data 110 from a Jun. 30, 2006 column of a company Balance Sheet is indicated of interest to the user. The data is selected and transferred to the second quarter (Q2) cell 115 of the alternate window for collection and analysis.

Figure 3:
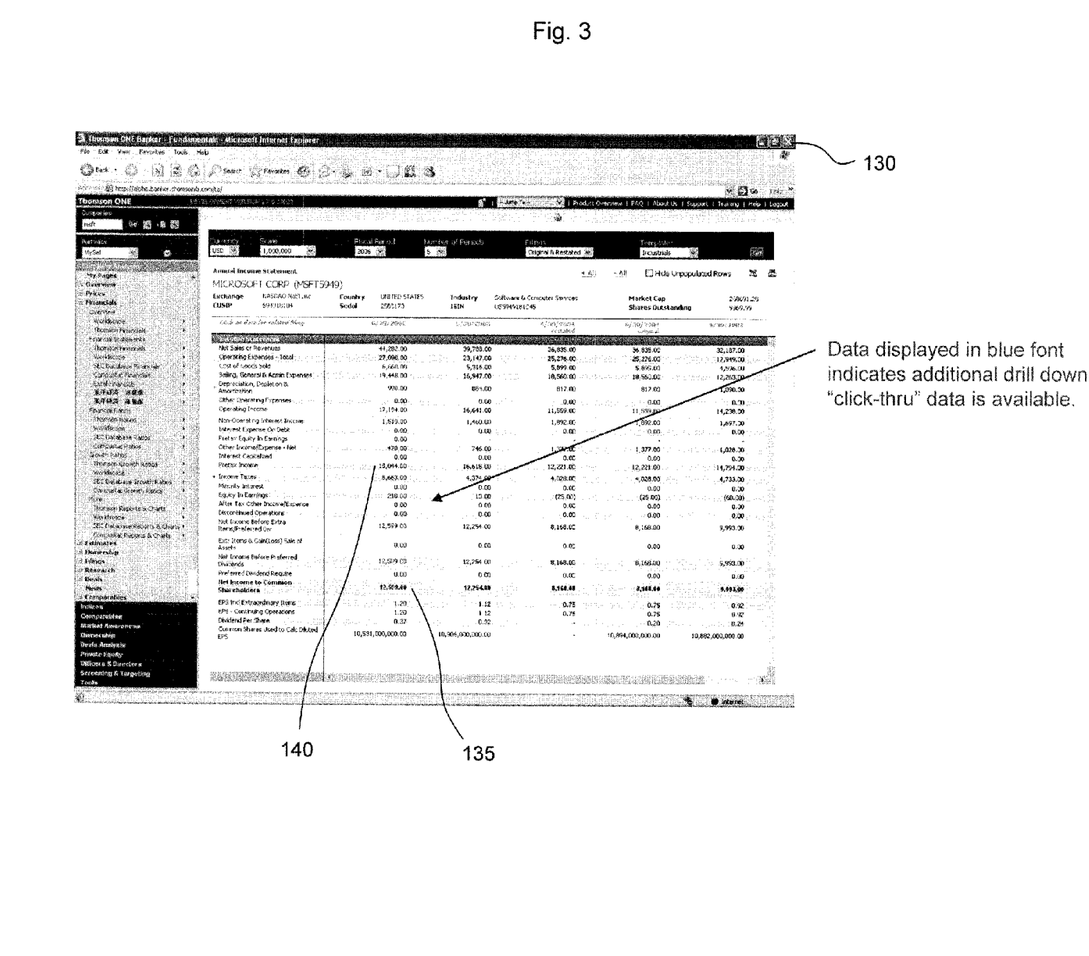
Figure 4:
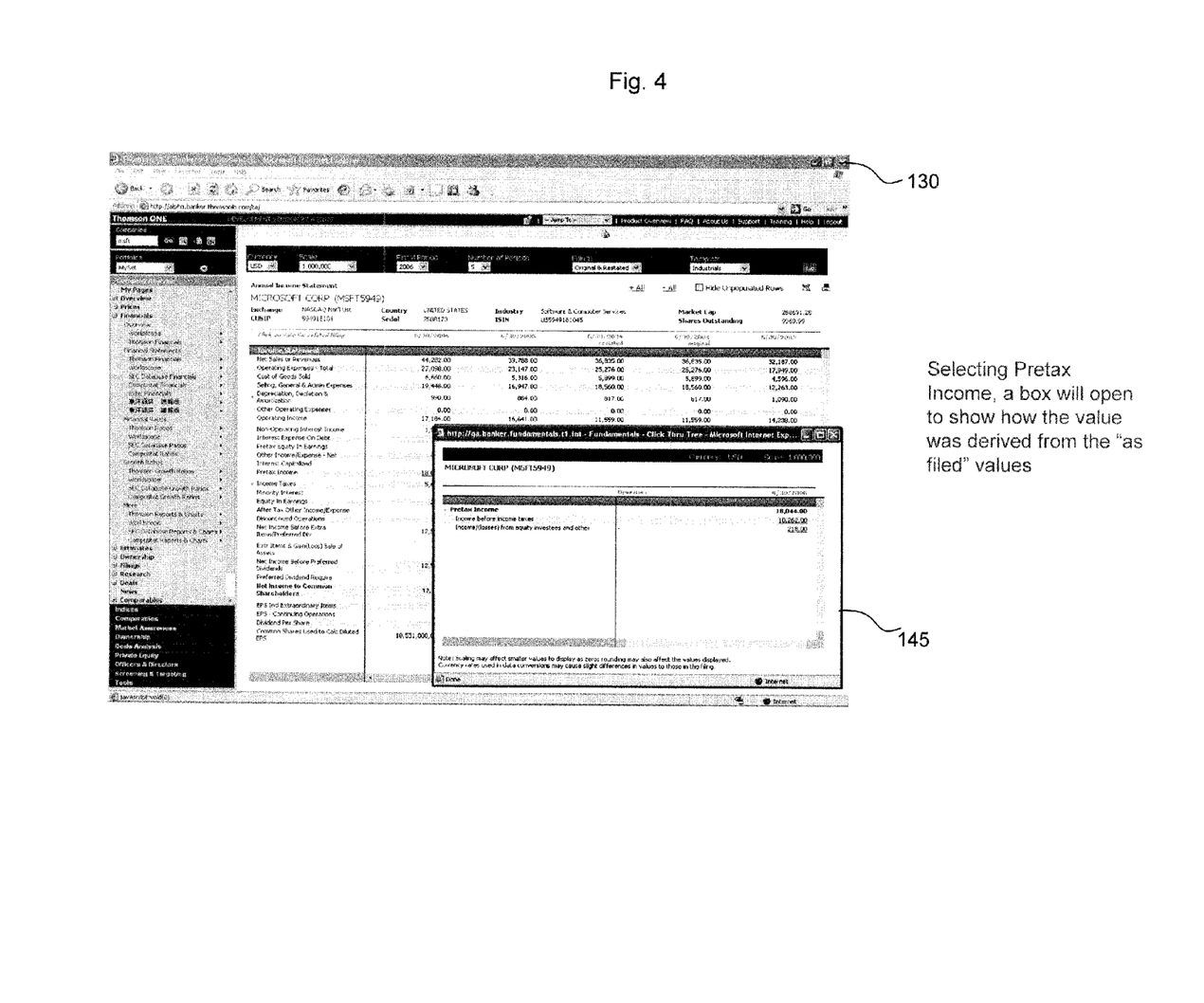
Figure 5:
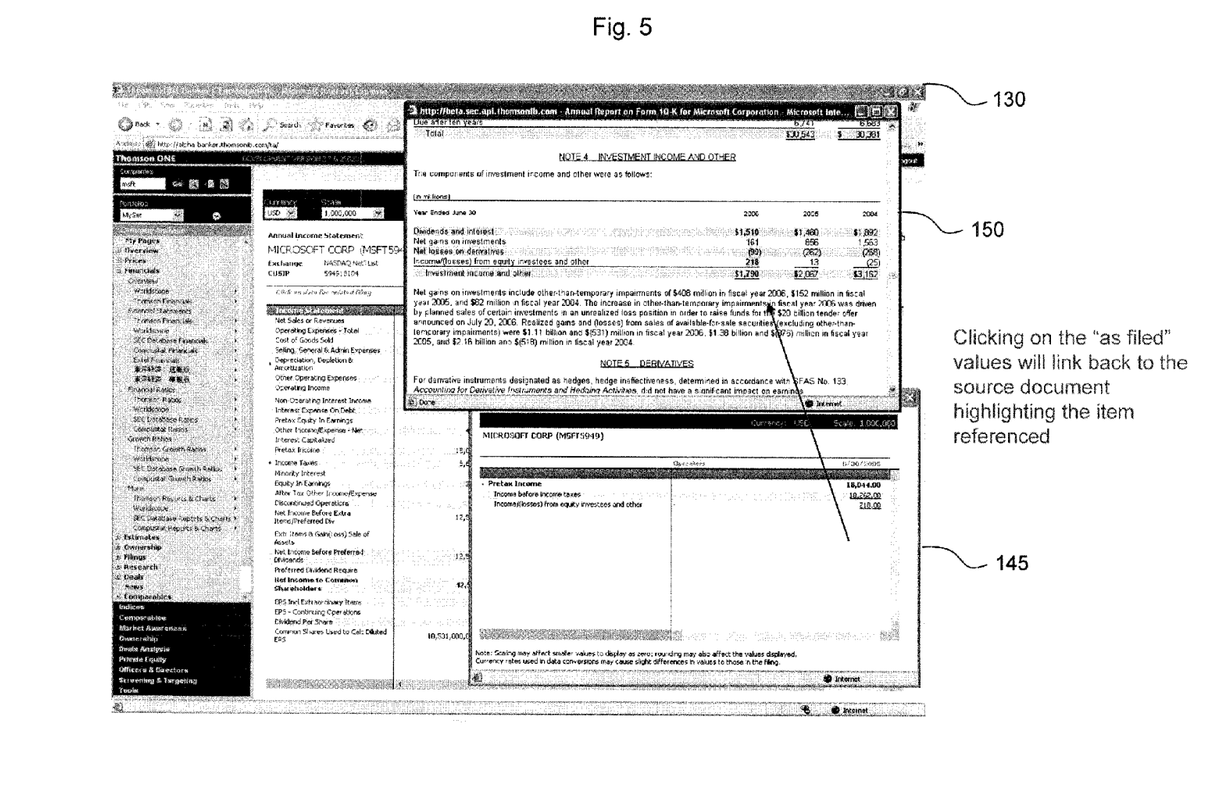

Turning to FIG. 3, an exemplary embodiment of the present invention is depicted. On screen 130, data previously collected for MICROSOFT CORP (MSFT5949) is highlighted by display in an alternative color, such as blue. Individual numerical figures, such as Net Income to Common Shareholders 135 of $12,599.00 indicate that additional click-thru information is available if the client user wishes to drill down for more detail. If the client user selects one such figure, such as the Pretax Income 140 of $18,044.00 an additional screen 145 depicted in FIG. 4 can be provided to show how the value was derived from the "as filed" values. Further click-thru on the "as filed" values may be performed. A client user may select a value, such as those on the first click-thru screen 145 to link back to more source data. As illustrated in FIG. 5, such click-thru data may appear on an additional screen 150 where the source documents may highlight the item referenced.

Figure 6:
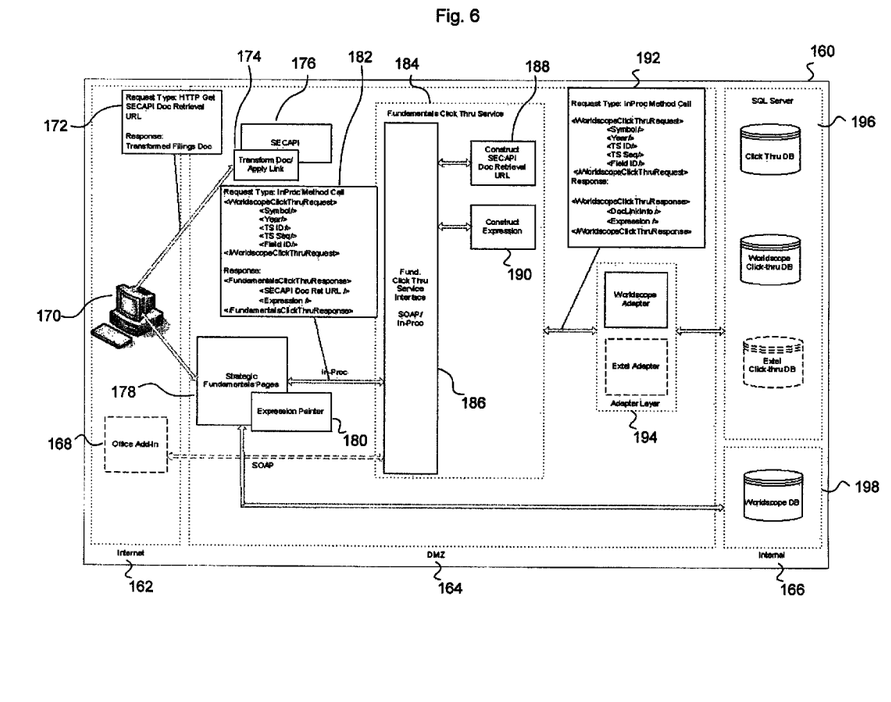
FIG. 6 is an illustration of an application side system flow diagram for click-thru document data management.

FIG. 6 is a exemplary process flow diagram of an embodiment. System 160 may be comprised of three zones, Internet 162, processing 164 (shown as DMZ), and Internal storages areas 166. Client user 170 (represented by a terminal) may send a request signal 172 to retrieve a document via SECAPI 176, during which the document is transformed and a link is established 174. An application interface Add-In 168 operatively communicates with Fundamentals Click-Thru Service Interface 186. Further communication with Client User 170 and Fundamental Click-Thru Service Interface and SOAP/In-Process 186 may be accomplished by Strategic Fundamentals Pages 178. Requests and responses 182 between Strategic Fundamentals Pages and Fundamental Click-Thru Service Interface and SOAP/In-Proc 186 operatively connect Client User 170 to additional functionality provided by the Fundamentals Click-Thru Services 184. Information contained within the request signal may comprise symbol, year and ID information important to the user. The system may respond with information such as for example a SECAPI Document Return Universal Resource Locator (URL). Expressions Painter 180, within the Strategic Fundamentals Pages can aide in request and response formulation.

Fundamentals Click-Thru Service 184, containing Fundamental Click-Thru Service Interface 186 may communicate with process Construct SECAPI Doc Retrieval URL 188 and Construct Expression 190. Signals 192 may be passed between the Fundamentals Click-Thru Service 184 and the Adaptive Layer 194 containing the application adapters, such as the Worldscope Adapter and the Extel Adapter. Information regarding the Client User 170 actions may ultimately be stored in SQL Server 196 storage, such as the Click-Thru Database, Worldscope Click-Thru Database, or the Extel Click-Thru Database. The Strategic Fundamentals Pages 178 may communicate information between the user 170 and an additional storage location 198, such as a Worldscope Database.

Figure 7:
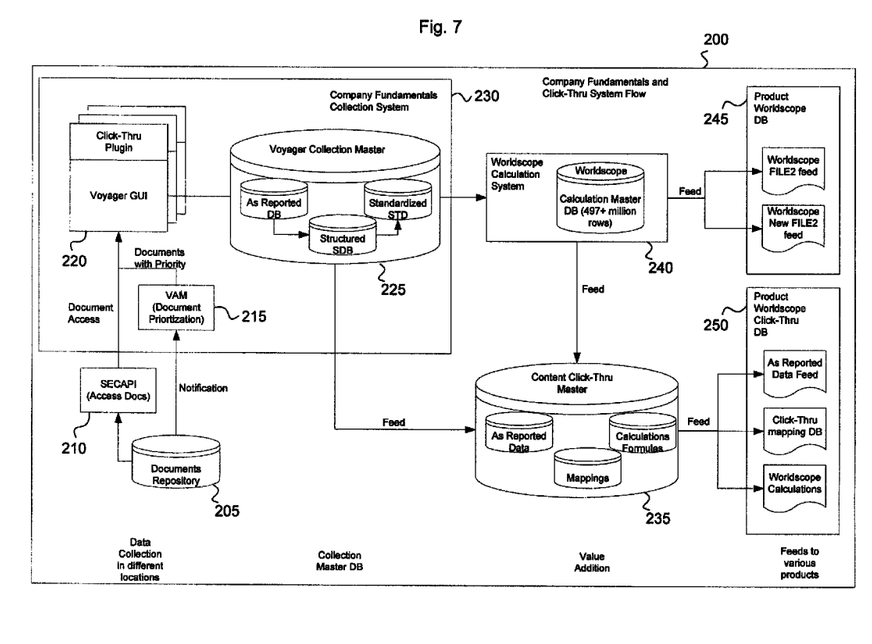
FIG. 7 shows a system flow diagram depicting document retrieval and manipulation for click-thru processing.

In one exemplary embodiment, system 200 of FIG. 7 may provide a Document Repository 205 from which information can be gained via a SECAPI 210 interface or a VAM prioritization process 215 to support various Analyst Reviewer terminals operating graphical user interfaces (GUIs) 220.

Information from the repository may be collected in a Master database structure 225 associated with the operating application. Information may be allowed to flow from one sub-structure within the database to other sub-structures where the information may be formatted and standardized. Information from Collection Master database structure 225 can be passed to and stored at Calculation System 240 or to Content Click-Thru Master database structure 235, a database structure separate and distinct from the application. Calculation information derived as a result of information obtained at Calculation System 240 may be deposited into Content Click-Thru Master database 235. Information may be allowed to flow from one sub-structure within Content Click-Thru Master database structure 235 to other sub-structures. Sub-structures may comprise data as reported, mapping information, and formulas for calculation. Results of Calculation System 240 and information stored at Content Click-Thru Master database structure 235 can be passed to additional database structures 245 and 250 to support various products.

STATEMENT REGARDING PREFERRED EMBODIMENTS

While the invention has been described with respect to the foregoing, those skilled in the art will readily appreciate that various changes and/or modifications can be made to the invention without departing from the spirit or scope of the invention as defined by the appended claims.

What is claimed is:

1. An automated computer implemented method comprising:
    receiving, by a processor, an insertion request from within a receiving document;
    receiving, in response to said insertion request, a pixelated image document by said processor;
    identifying, from said image document a map set of pixel coordinates defining the position of a select image portion on said image document;
    converting said select image portion to data in a standard format;
    reviewing automatically, by said processor, a history of prior data previously collected from prior image documents;
    searching said history of prior data previously collected, wherein said data is mapped and collected to a collection system based on said prior data by:
        creating a unique pointer to said image document as a result of defining the position of said select image portion associated with said map set of pixel coordinates of said select image portion on said image document, and
        storing in a database said unique pointer and said select image portion associated with said map set of pixel coordinates;
    incorporating, by said processor, into said receiving document said unique pointer and a representation of said select image portion; and
    providing from said receiving document access to said select image at said map set of pixel coordinates of said image document at a later time.

2. The automated computer implemented method of claim 1 wherein the image document is a pdf document.

3. The automated computer implemented method of claim 2 wherein the pdf document is a native pdf document.

4. The automated computer implemented method of claim 2 wherein the pdf document is an image-pdf document.

5. The method of claim 1 wherein the unique pointer comprises an address of said documents and said position of said select image portion.

6. The method of claim 1 further binding said unique pointer to a step-through series of previously incorporated pointers configured to provide access to said select image at a later time in a step-through manner.

7. The method of claim 1 wherein said select image portion of said document is identified by a mouse-over gesture.

8. The method of claim 7 wherein said select image portion identified by a mouse-over gesture is expanded in response to a passage of time.

9. The method of claim 8 wherein said expansion includes additional elements within proximity to the mouse-over gesture.

10. The method of claim 1 wherein said select image portion is associated with a label derived from one or more related elements within said image document.

11. An automated computer implemented method comprising:

receiving, by a processor, an insertion request from within a receiving document;

receiving, in response to said insertion request, a pixelated image document by said processor;

identifying, by said processor, from said image document a map set of pixel coordinates defining the position of a select image portion on said image document;

deconstructing said select image portion, by said processor, into subunits and associating said subunits with a subunit map set of pixel coordinates;

converting said select image portion to data in a standard format;

reviewing automatically, by said processor, a history of prior data previously collected from prior image documents;

searching said history of prior data previously collected, wherein said data is mapped and collected to a collection system based on said prior data by:

creating a unique pointer, by said processor, to said image document as a result of defining the position of said select image portion associated with said map set of pixel coordinates, and storing, in a database, said unique pointer and said deconstructed subunits in association with said subunit map set of pixel coordinates to said image document;

incorporating, by said processor, into said receiving document said unique pointer and a representation of said deconstructed subunits;

providing from said receiving document access to said select image at said subunit map set of pixel coordinates of said image document at a later time.

12. The automated computer implemented method of claim 11 wherein the image document is a pdf document.

13. The automated computer implemented method of claim 12 wherein the pdf document is a native pdf document.

14. The automated computer implemented method of claim 12 wherein the pdf document is an image-pdf document.

15. The automated computer implemented method of claim 11 wherein the deconstructed subunits are characters.

16. The method of claim 11 wherein the unique pointer comprises an address of said documents and said position of said select image portion.

17. The method of claim 11 further binding said unique pointer to a step-through series of previously incorporated pointers configured to provide access to said select image at a later time in a step-through manner.

18. The method of claim 11 wherein said select image portion of said document is identified by a mouse-over gesture.

19. The method of claim 18 wherein said select image portion identified by said mouse-over gesture is expanded in response to a passage of time.

20. The method of claim 19 wherein said expansion includes additional elements within proximity to the mouse-over gesture.

21. The method of claim 11 wherein said select image portion is associated with a label derived from one or more related elements within said image document.

* * * * *